United States Patent
Akenine-Moller et al.

(10) Patent No.: US 9,582,847 B2
(45) Date of Patent: Feb. 28, 2017

(54) COLOR BUFFER COMPRESSION

(71) Applicant: Intel Corporation, Santa Clara, CA (US)

(72) Inventors: Tomas G. Akenine-Moller, Lund (SE); Jim K. Nilsson, Lund (SE); Jon N. Hasselgren, Bunkeflostrand (SE); Magnus Andersson, Helsingborg (SE)

(73) Assignee: Intel Corporation, Santa Clara, CA (US)

( * ) Notice: Subject to any disclaimer, the term of this patent is extended or adjusted under 35 U.S.C. 154(b) by 475 days.

(21) Appl. No.: 13/867,250

(22) Filed: Apr. 22, 2013

(65) Prior Publication Data
US 2014/0313211 A1   Oct. 23, 2014

(51) Int. Cl.
G09G 5/02 (2006.01)
G09G 5/39 (2006.01)
G06T 1/60 (2006.01)
G06T 11/00 (2006.01)
G06T 11/40 (2006.01)

(52) U.S. Cl.
CPC ............ G06T 1/60 (2013.01); G06T 11/001 (2013.01); G06T 11/40 (2013.01)

(58) Field of Classification Search
CPC .................. G06F 3/122; G06T 11/001
See application file for complete search history.

(56) References Cited

U.S. PATENT DOCUMENTS

| 5,684,939 A * | 11/1997 | Foran ............ G06T 11/001 345/612 |
| 2005/0134525 A1* | 6/2005 | Tanghe et al. .......... 345/1.1 |
| 2005/0243346 A1* | 11/2005 | Foehr et al. .......... 358/1.9 |
| 2008/0284780 A1* | 11/2008 | Hsu ............ G06T 15/40 345/422 |
| 2010/0066762 A1* | 3/2010 | Yeh et al. ............ 345/629 |
| 2011/0055441 A1* | 3/2011 | Uchiyama .............. 710/68 |
| 2011/0188836 A1* | 8/2011 | Popkiewicz ........ G06Q 30/02 386/278 |
| 2014/0015843 A1* | 1/2014 | Bolz .................... 345/545 |
| 2014/0253582 A1* | 9/2014 | Chen et al. ............ 345/594 |

OTHER PUBLICATIONS

CN office action issued in corresponding CN application No. 201410160631.X dated Nov. 16, 2016 (7 pages) [no translation].
CN office action in corresponding CN application No. 201410160631.X dated Nov. 2, 2016 (7 pages).

* cited by examiner

*Primary Examiner* — Phi Hoang
(74) *Attorney, Agent, or Firm* — Trop Pruner & Hu, P.C.

(57) ABSTRACT

In accordance with some embodiments, a mask or table may be maintained to record information about whether or not each pixel within a tile is cleared. As used herein, a "cleared" tile is one that is not covered by any other depicted objects. The clear mask may store a bit per pixel or sample to indicate whether the pixel or sample contains a color value or whether it is cleared. As a result, the compression ratio may be increased for partially covered tiles in some embodiments.

18 Claims, 4 Drawing Sheets

COLOR BUFFER COMPRESSION

BACKGROUND

This relates generally to graphics processing for computers and particularly to caching data in a color cache.

In order to increase performance for graphics processing units (GPUs), memory bandwidth reduction techniques are employed. One way to decrease the bandwidth requirements is to perform buffer compression. A graphics system may use a color buffer where the colors of the pixels are drawn and a depth buffer where the depth of each pixel is stored. During rendering, these buffers are read and written to, and often the same pixel is accessed several times for both buffers. These read and write accesses are expensive in terms of energy consumption and may advantageously be reduced to the extent possible, in particular for user terminals with limited power supply, such as mobile devices.

BRIEF DESCRIPTION OF THE DRAWINGS

Some embodiments are described with respect to the following figures.

DETAILED DESCRIPTION

Figure 1:
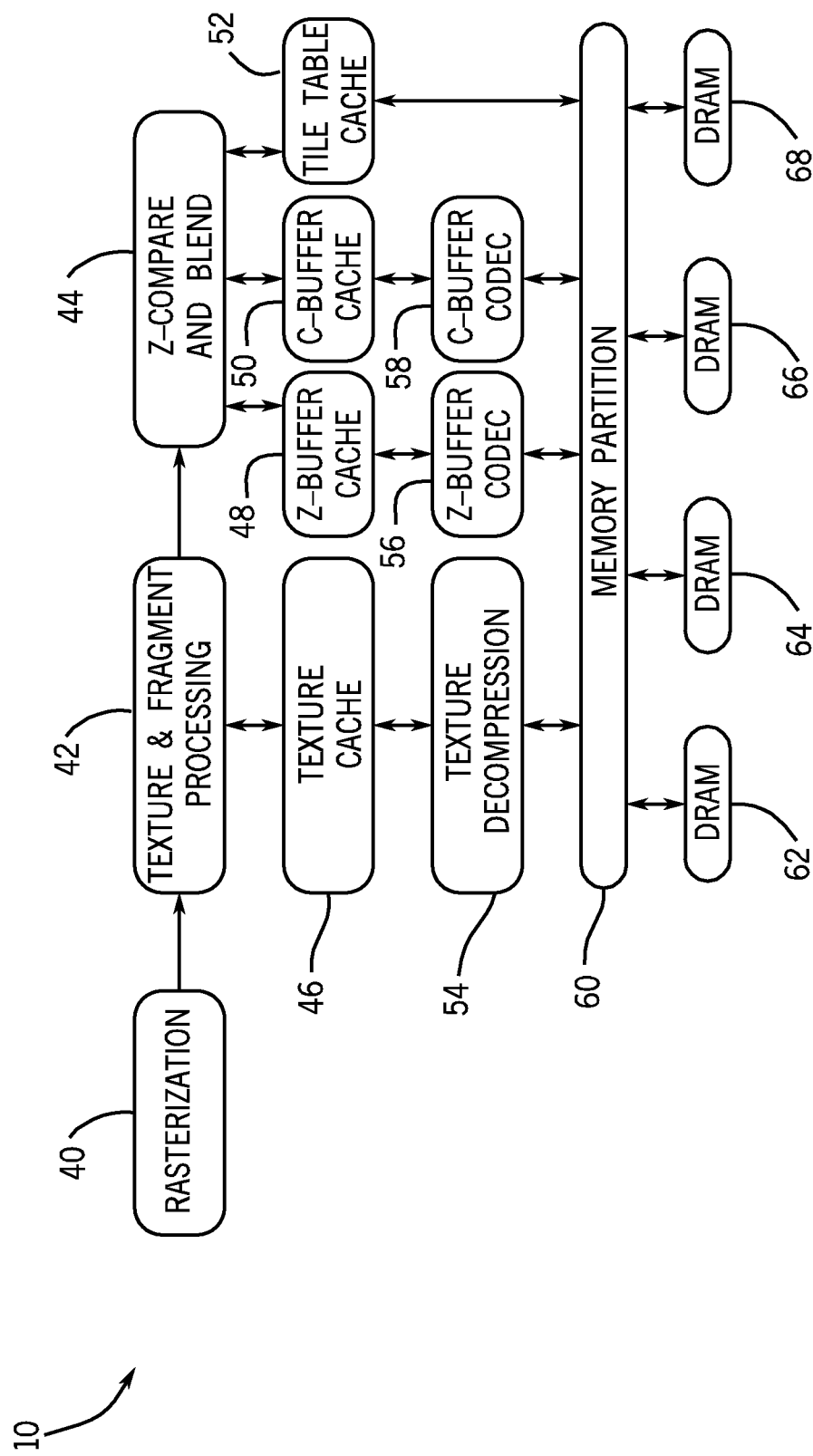
FIG. 1 is a schematic depiction of one embodiment.

In accordance with some embodiments, a mask or table may be maintained to record information about whether or not each pixel within a tile is cleared. As used herein, a "cleared" tile, pixel, or sample is one that is not covered by any other depicted objects. The clear mask may store a bit per pixel or sample to indicate whether the pixel or sample contains a color value or whether it is cleared. As a result, the compression ratio may be increased for partially covered tiles in some embodiments.

Buffer compression/decompression can be used in three-dimensional (3D) graphics, such as games, 3D maps and scenes, 3D messages, e.g. animated messages, screen savers, man-machine interfaces (MMIs), etc., but is not limited thereto. Thus, the compression/decompression may also be employed for encoding other types of images or graphics, e.g. one-dimensional (1D), two-dimensional (2D) or 3D images.

The compression and decompression collectively handles a plurality of pixels, typically in the form of a block or a tile of pixels. In an embodiment, a pixel block has the size of M×N pixels, where M, N are integer numbers with the proviso that both M and N are not simultaneously one. Preferably, $M=2^m$ and $N=2^n$, where m, n are zero or integers with the proviso that m and n are not simultaneously zero. In a typical implementation M=N and such block embodiments may be 4×4 pixels, 8×4, 8×8 pixels or 16×16 pixels.

The expression pixel or "block element" refers to an element in a block or encoded representation of a block. This block, in turn, corresponds to a portion of an image, texture or buffer. Thus, a pixel may be a texel (texture element) of a (1D, 2D, 3D) texture, a pixel of a (1D or 2D) image or a voxel (volume element) of a 3D image. Generally, a pixel is characterized with an associated pixel parameter or property value or feature. There are different characteristic property values that can be assigned to pixels, typically dependent on what kind of pixel block is being handled. For instance, the property value may be a color value assigned to the pixel. Different color spaces are available for representing pixel color values. One color space is the so-called red, green, blue (RGB) color space. A pixel property value may therefore be a red value, a green value or a blue value of an RGB color.

A pixel color can also be expressed in the form of luminance and chrominance components. In such a case, a transform can be used for converting a RGB color value into a luminance value and, typically, two chrominance components. Examples of luminance-chrominance spaces include YUV, $YC_oC_g$ and $YC_rC_b$. A property value can therefore also be a luminance value (Y) or a chrominance value (U, V, $C_o$, $C_g$, $C_r$, or $C_b$). In the case of compressing/decompressing pixel blocks of a color buffer, RGB colors of pixels may be converted into the luminance/chrominance color space. This not only decorrelates the RGB data leading to improved compression rates but also allows the possibility of having different compression strategies for the luminance and chrominance components. Thus, as the human visual system is more susceptible to errors in the luminance component, the chrominance components can typically be compressed more aggressively than the luminance component.

In FIG. 1, a graphics processor 10 may include a rasterization pipeline including a rasterization unit 40, a texture and fragment processing unit 42, and a depth or Z compare and blend unit 44. Each of these units may be implemented in whole or in part by software or hardware in some embodiments.

The texture and fragment processing unit 42 is coupled to a texture cache 46. The cache 46 is in turn coupled to a memory partition 60 through a texture decompression module 54. Thus, texture information stored in the cache may be decompressed between the memory partition and the cache.

The depth compare and blend unit 44 is coupled to a depth buffer cache 48, a color buffer cache 50 and a tile table cache 52. In turn, the depth buffer cache 48 is coupled to the memory partition 60 through the depth buffer coder/decoder (codec) 56. Likewise, the color buffer cache 50 couples the memory partition 60 through the color buffer coder/decoder (codec) 58. The memory partition 60 may be coupled to dynamic random access memory (DRAM) 62, 64, 66 and 68 which may be part of system memory. In some embodiments, a unified cache may be used that includes the texture cache, the depth buffer cache and the color buffer cache.

In some embodiments, a unified codec may replace the units 54, 56, and 58. Various configurations are described in further detail in the article, *Floating Point Buffer Compression in a Unified Codec Architecture* by Ström, et al. Graphics Hardware (2008).

Figure 2:
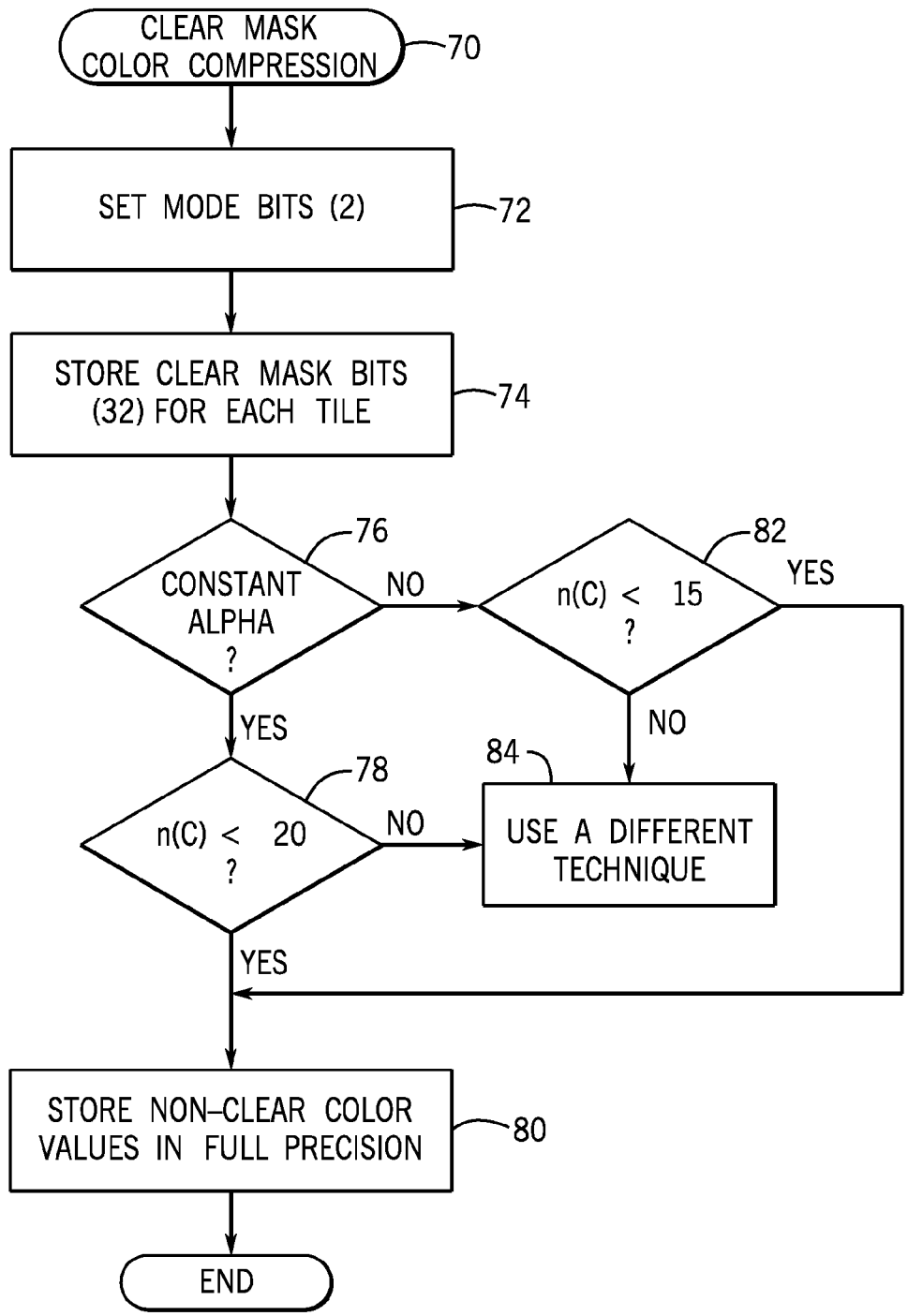
FIG. 2 is a flow chart for one embodiment using a tile size of 8×4 pixels.

Referring to FIG. 2, a sequence 70 for a color buffer compression may be implemented in hardware, software and/or firmware. In software and firmware embodiments it may be implemented by computer executed instructions stored in one or more non-transitory computer readable media such as a magnetic, optical or semiconductor storage media. Examples of such storage media may include the color buffer cache itself, the dynamic random access memory, or a processor associated therewith, such as a graphics processing unit, to mention a few examples.

The sequence may begin by setting mode bits (block 72). In one embodiment two mode bits are provided. Compression of color involves a common case of a constant alpha color channel over the tile separately, as well as the case where alpha values vary over the tile. Thus two mode bits may be used to cover the three possible situations: firstly, the alpha value may be constant and may be zero for the whole tile; secondly, the alpha value may be constant one (where one is typically encoded as 255 for 8 bit render targets) over the whole tile; and thirdly, the alpha value is not constant, that is not zero or one over the whole tile.

A typical tile size is 8×4 pixels. But the present invention is not limited to any particular tile size. In addition, currently cache line sizes are 64 bytes. That is, an uncompressed tile fits into two cache lines and a compressed tile fits into one cache line. But the present disclosure is not limited to any particular compression ratio or any particular cache line size.

Next the clear mask bits are stored for each tile, as indicated in block 74. In an embodiment where the tile size 8×4, there are 32 such clear mask bits for each tile. A one in the clear mask C indicates that the pixel is cleared in one embodiment. One benefit of using a clear mask is that color values have to be stored only for non-cleared pixels. The total number of non-cleared pixels, namely zeroes, in the mask, in one embodiment, is denoted by n(C). If a clear mask is used then in an embodiment with a 512 bit cache line, 480 bits remain to represent the non-cleared colors after accounting for the 32 bits for the clear mask. Then accounting for the two mode bits and assuming a constant alpha, only three color values are stored per pixel in the case with a 24 bit RGB value.

For a constant alpha value (diamond 76) given the bit budget remaining and the color channel precision, then so long as the number of non-cleared pixels or samples is less than 20 (diamond 78), the non-clear color values can be stored in full precision and consequently the tile could always be compressed as indicated in block 80. Namely, if you take 480 bits remaining minus the two mode bits and divide by 24 bits per pixel (in an embodiment using a 24 bit RGB scheme), you get 19.92 pixels.

For a non-constant value of alpha (i.e. the no option at diamond 76), then the number of bits that are not cleared should be less than 15 (diamond 82) in order to store full precision in one cache line (block 84). This is determined by dividing 478 by 32 bits per pixel equaling 14.94 no cleared bits per tile.

Thus, typically the contents of a compressed tile would include two mode bits followed by 32 clear mask bits followed by the actually used compression bits. As an example, if there were 12 non-cleared bits, then you would have 2+32+12×24 equals 322 bits that fit well within the 512 bit budget of a cache line.

If the number of non-cleared bits is greater than or equal to 20 for the constant alpha case, any other compression scheme can be used as usual. For example, delta color compression may be used. In delta color compression, for each tile or group of pixels, a single reference value is stored for each color channel. The individual pixel colors are then encoded as delta-values from the reference value. The difference compared to delta color compression is that as the number of non-cleared bits varies, the number can be combined with varying number of delta bits for the color components. As an example, delta bit distributions for these cases are indicated in the following table:

| N(C) | Compression method | Misc | Unused bits |
|---|---|---|---|
| 1, 2, 3, . . . , 19 | Store uncompressed RGB | Always works | Does not matter |
| 20 | Delta color compression | Delta bits: 7 + 8 + 7 | 14 |
| 21 | Delta color | Delta bits: | 13 |

-continued

| N(C) | Compression method | Misc | Unused bits |
|---|---|---|---|
|  | compression | 7 +7 + 7 |  |
| 22 | Delta color compression | Delta bits: 7 + 7 + 6 | 14 |
| 23 | Delta color compression | Delta bits: 6 + 7 + 6 | 17 |
| 24 | Delta color compression | Delta bits: 6 + 6 + 6 | 22 |
| 25 | Delta color compression | Delta bits: 6 + 6 + 6 | 4 |
| 26 | Delta color compression | Delta bits: 6 + 6 + 5 | 12 |
| 27 | Delta color compression | Delta bits: 5 + 6 + 5 | 22 |
| 28 | Delta color compression | Delta bits: 5 + 6 + 5 | 6 |
| 29 | Delta color compression | Delta bits: 5 + 5 + 5 | 19 |
| 30 | Delta color compression | Delta bits: 5 + 5 + 5 | 4 |
| 31 | Delta color compression | Delta bits: 5 + 5 + 4 | 20 |

The table above is straightforward for generalizing to RGBA as well. The remaining unused bits that are left over in the various bit distributions can also be utilized to increase the delta range of a subset of the pixels in a tile. For example, in the case where the number of non-cleared bits is 24, 22 unused bits may be used to increase the number of delta bits from 6+6+6 to 6+7+6 for 22 of the 24 pixels. There is also a possibility to exploit the unused bits a little bit better. For example, one can spread the remaining unused bits on the first M colors in a tile, so that the number of delta bits are higher in some pixels, and lower in some.

Different combinations of tile size and cache line sizes allow for different maximum compression ratios as shown in the following table. A tile of 8×8 pixels can be maximally compressed with a 8:1 ratio with a cache line of 32 bytes, meaning that the tile is stored in one cache line instead of eight. In that case, up to nine pixel color values (256−2−32)/24)) can be stored at full resolution assuming constant alpha values:

|  | Cache line size | | |
|---|---|---|---|
| Tilesize (bytes) | 32 B | 64 B | 128 B |
| 4 × 4 (64 B) | 2:1 | — | — |
| 8 × 4 (128 B) | 4:1 | 2:1 | — |
| 8 × 8 (256 B) | 8:1 | 4:1 | 2:1 |

In another embodiment, instead of storing a clear mask as a one bit per pixel bit field, the same information can be incorporated into an existing compression method. When a delta compression scheme is present, one predetermined bit combination of RGB-delta values can be used to denote a cleared pixel. For example if all the delta values for a particular pixel are all set to ones, the buffered clear color is implied for that pixel instead. This approach decreases the success ratio of the compressor since it shrinks the number of representable colors by one. In many cases, however, this slight loss is outweighed by the ability to represent cleared pixels.

For a specific tile, a triangle is rasterized and the resulting coverage is depicted below. The boxes 0-2, 9-11, 18-20, and 27-29 are covered pixels of the tile, and color information is stored for these pixels.

|   |   |   | 3  | 4  | 5  | 6  | 7  |
|---|---|---|----|----|----|----|----|
| 8 |   |   |    | 12 | 13 | 14 | 15 |
| 16| 17|   |    |    | 21 | 22 | 23 |
| 24| 25| 26|    |    |    | 30 | 31 |

In this example, the contents of the compressed tile would look like the following:

| Mode | Clear | Mask | 0 1 2 9 10 11 18 20 27 28 29 | unused |
|------|-------|------|------------------------------|--------|

The total bit count is 2+32+12×24=322, which fits comfortably within the 512 bit budget of a cache line.

Figure 3:
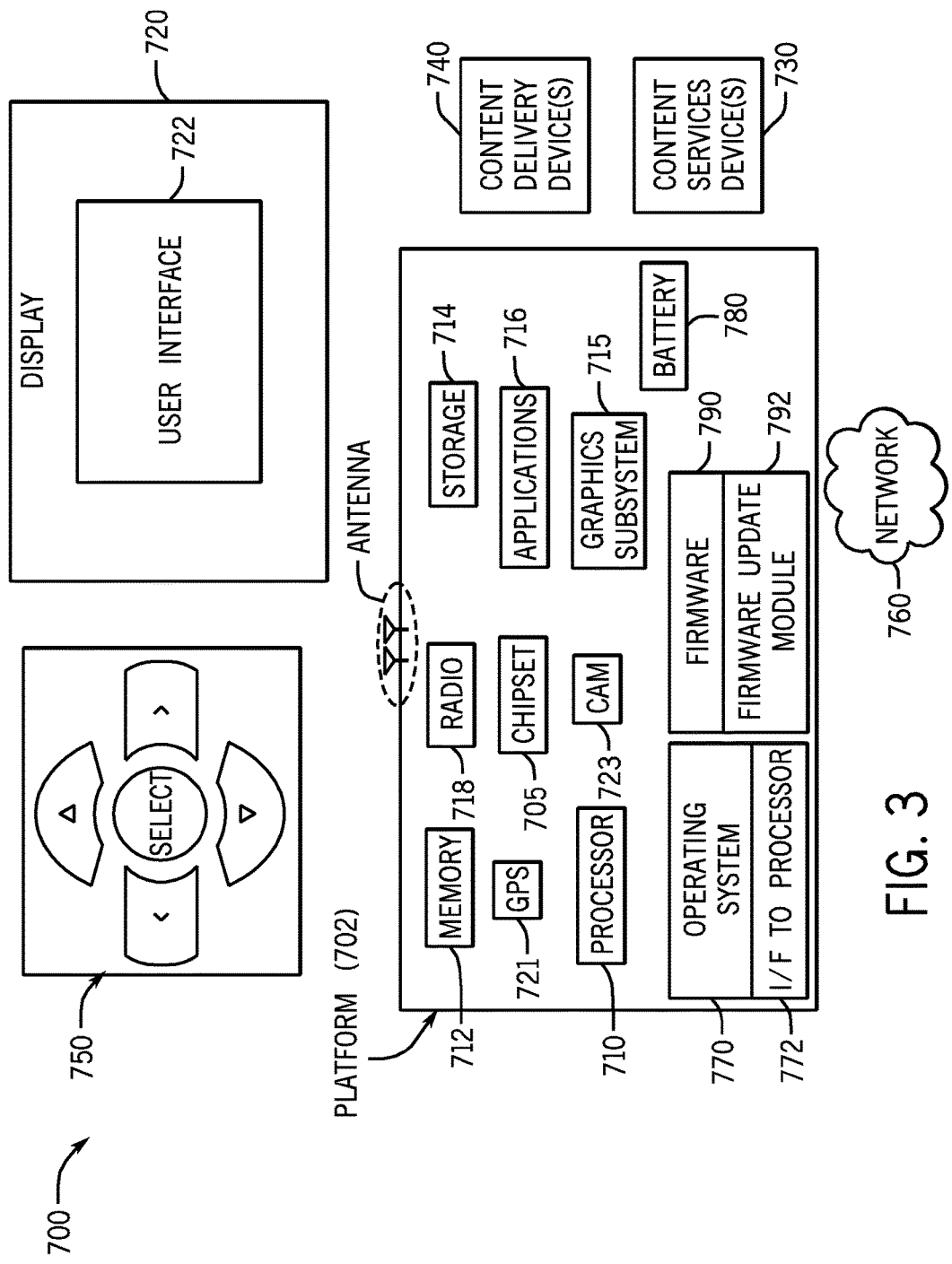
FIG. 3 is a system depiction for one embodiment.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 2 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
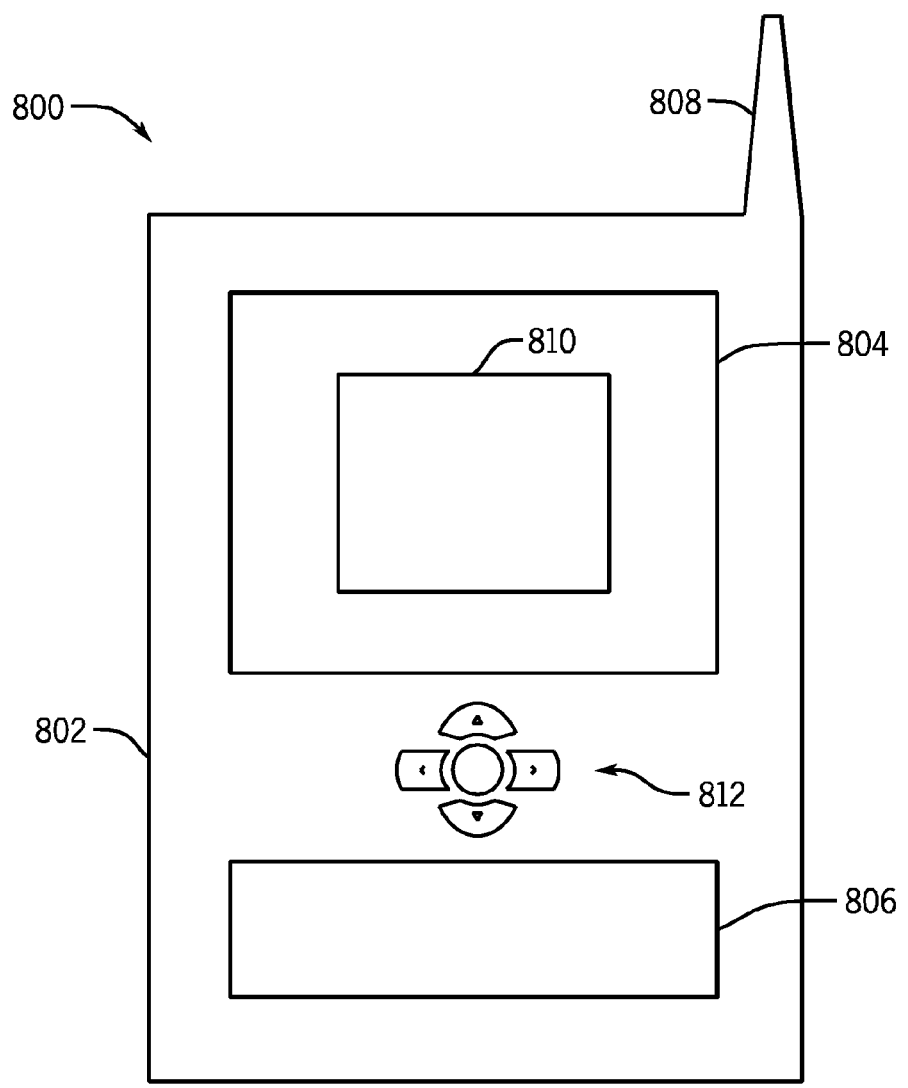
FIG. 4 is a front elevational view for one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 2 in software and/or firmware embodiments.

As shown in FIG. 4, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a computer executed method comprising determining whether a tile of pixels or samples has a constant or varying alpha value, determining a number of cleared pixels or samples for the tile, and based on the alpha value determination and the number of cleared pixels or samples, determining how to store the tile. The method may also include using two bits to store the alpha value determination. The method may also include providing three alpha value determinations including constant zero, constant one and varying. The method may also include storing a clear bit for each pixel or sample of the tile to indicate whether the pixel or sample is cleared. The method may also include determining a maximum number of clear bits for a tile to be storable in one cache line. The method may also include determining a maximum number of clear bits for each of constant and varying alpha values to compress a tile for storage in one cache line.

In another example embodiment one or more non-transitory computer readable media storing instructions that cause a processor to perform a sequence comprising determining whether a tile of pixels or samples has a constant or varying alpha value, determining a number of cleared pixels or samples for the tile, and based on the alpha value determination and the number of cleared pixels or samples, determining how to store the tile. The media may further store said sequence including using two bits to store the alpha value determination. The media may further store said sequence including providing three alpha value determinations including constant zero, constant one and varying. The media may further store said sequence including storing a clear bit for each pixel or sample of the tile to indicate whether the pixel or sample is cleared. The media may further store said sequence including determining a maximum number of clear bits for a tile to be storable in one cache line. The media may further store said sequence including determining a maximum number of clear bits for each of constant and varying alpha values to compress a tile for storage in one cache line.

In another example embodiment may be an apparatus comprising a processor to perform a sequence comprising determining whether a tile of pixels or samples has a constant or varying alpha value, determining a number of cleared pixels or samples for the tile, and based on the alpha value determination and the number of cleared pixels or samples, determining how to store the tile, and a storage coupled to said processor. The apparatus may include said sequence including using two bits to store the alpha value determination. The apparatus may include said sequence including providing three alpha value determinations including constant zero, constant one and varying. The apparatus may include said sequence including storing a clear bit for each pixel or sample of the tile to indicate whether the pixel or sample is cleared. The apparatus may include said sequence including determining a maximum number of clear bits for a tile to be storable in one cache line. The apparatus may include said sequence including determining a maximum number of clear bits for each of constant and varying alpha values to compress a tile for storage in one cache line. The apparatus may include an operating system, a battery and firmware and a module to update said firmware.

Another example embodiment may be an apparatus comprising a memory and a processor coupled to said memory to determine whether a pixel is cleared because it is not covered by any other depicted object and only storing color values in said memory for pixels that are not cleared. The apparatus may include said processor is a graphics processing unit. The apparatus may include said processor to store a clear mask of 1 bit per pixel in each compressed tile. The apparatus may include said processor to use two mask bits to indicate whether the alpha value is zero, one or not constant over the whole tile. The apparatus may include said processor to store color values in full precision. The apparatus may include said processor to use a bit of delta value to denote a cleared pixel. The apparatus may include an operating system, a battery, and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments, those skilled in the art will appreciate numerous modifications and variations therefrom. It is intended that the appended claims cover all such modifications and variations as fall within the true spirit and scope of this disclosure.

What is claimed is:

1. A computer executed method comprising:
using two mode bits to indicate one of whether a tile has a constant alpha value, a constant alpha value of one or that the tile's alpha value varies across the tile; and
based on whether a tile of pixels or samples has a constant or varying alpha value, determining how to store the tile.

2. The method of claim 1 including providing three alpha value determinations including constant zero, constant one and varying.

3. The method of claim 1 including storing a clear bit for each pixel or sample of the tile to indicate whether the pixel or sample is cleared.

4. The method of claim 3 including determining a maximum number of clear bits for a tile to be storable in compressed form.

5. The method of claim 4 including determining a maximum number of clear bits for each of constant and varying alpha values to compress a tile for storage in compressed form.

6. One or more non-transitory computer readable media storing instructions that cause a processor to perform a sequence comprising:
using two mode bits to indicate one of whether a tile has a constant alpha value, a constant alpha value of one or that the tile's alpha value varies across the tile; and
based on determining whether a tile of pixels or samples has a constant or varying alpha value and the number of cleared pixels or samples for the tile, determining how to store the tile.

7. The media of claim 6, said sequence including providing three alpha value determinations including constant zero, constant one and varying.

8. The media of claim 6, said sequence including storing a clear bit for each pixel or sample of the tile to indicate whether the pixel or sample is cleared.

9. The media of claim 8, said sequence including determining a maximum number of clear bits for a tile to be storable in compressed form.

10. The media of claim 9, said sequence including determining a maximum number of clear bits for each of constant and varying alpha values to compress a tile for storage in compressed form.

11. An apparatus comprising:
a processor to perform a sequence, wherein to perform the sequence, the processor is to: use two mode bits to indicate one of whether a tile has a constant alpha value, a constant alpha value of one or that the tile's alpha value varies across the tile; and based on whether a tile of pixels or samples has a constant or varying alpha value, determine how to store the tile; and
a storage coupled to said processor.

12. The apparatus of claim 11, wherein to perform said sequence, the processor is to provide three alpha value determinations including constant zero, constant one and varying.

13. The apparatus of claim 11, wherein to perform said sequence, the processor is to store a clear bit for each pixel or sample of the tile to indicate whether the pixel or sample is cleared.

14. The apparatus of claim 13, wherein to perform said sequence, the processor is to determine a maximum number of clear bits for a tile to be storable in compressed form.

15. The apparatus of claim 14, wherein to perform said sequence, the processor is to determine a maximum number of clear bits for each of constant and vary alpha values to compress a tile for storage in compressed form.

16. The apparatus of claim 11 including an operating system.

17. The apparatus of claim 11 including a battery.

18. The apparatus of claim 11 including firmware and a module to update said firmware.

* * * * *